US011034359B2

(12) United States Patent
Peters (10) Patent No.: US 11,034,359 B2
(45) Date of Patent: Jun. 15, 2021

(54) CONTROL DEVICE FOR A VEHICLE (71) Applicant: Dr. Ing. h.c. F. Porsche Aktiengesellschaft, Stuttgart (DE)

(72) Inventor: Yannik Peters, Renningen (DE)

(73) Assignee: Dr. Ing. h.c. F. Porsche Aktiengesellschaft

(*) Notice: Subject to any disclaimer, the term of this patent is extended or adjusted under 35 U.S.C. 154(b) by 143 days.

(21) Appl. No.: 16/577,026

(22) Filed: Sep. 20, 2019

(65) Prior Publication Data

US 2020/0172118 A1 Jun. 4, 2020

(30) Foreign Application Priority Data

Nov. 29, 2018 (DE) .......................... 102018130363.7

(51) Int. Cl.
| | |
|---|---|
| *B60W 50/00* | (2006.01) |
| *B60W 30/18* | (2012.01) |
| *B60W 10/20* | (2006.01) |
| *B60W 10/04* | (2006.01) |

(52) U.S. Cl.
CPC ............ *B60W 50/00* (2013.01); *B60W 10/04* (2013.01); *B60W 10/20* (2013.01); *B60W 30/18* (2013.01); *B60W 2050/0028* (2013.01); *B60W 2400/00* (2013.01); *B60W 2520/14* (2013.01); *B60W 2556/00* (2020.02)

(58) Field of Classification Search
CPC ...... B60W 50/00; B60W 30/18; B60W 10/20; B60W 10/04; B60W 2556/00; B60W 2050/0028; B60W 2520/14; B60W 2400/00; B60W 30/02; B60W 2520/10; B60W 2540/18; B60W 10/12; B60W 10/22
USPC .......................................................... 701/41
See application file for complete search history.

(56) References Cited

U.S. PATENT DOCUMENTS

| | | | | | |
|---|---|---|---|---|---|
| 5,455,770 | A | * | 10/1995 | Hadeler | ................... B60T 8/172 180/197 |
| 5,964,819 | A | * | 10/1999 | Naito | ...................... B62D 7/159 303/140 |
| 6,909,957 | B2 | * | 6/2005 | Suissa | ...................... B62D 6/00 180/443 |
| 7,184,868 | B2 | * | 2/2007 | Matsunaga | ........... B60T 8/1725 303/146 |
| 7,200,479 | B2 | * | 4/2007 | Smakman | ............. B60T 8/1755 701/70 |

(Continued)

FOREIGN PATENT DOCUMENTS

| | | |
|---|---|---|
| DE | 10039782 A1 | 2/2002 |
| DE | 102006052698 A1 | 5/2007 |

(Continued)

*Primary Examiner* — Jonathan M Dager
*Assistant Examiner* — Jean W Charleston
(74) *Attorney, Agent, or Firm* — RatnerPrestia (57) ABSTRACT

A control device for a vehicle as at least one input for vehicle data of the vehicle and at least one output for manipulated values for actuators of the vehicle. The control device is configured to determine manipulated values for the actuators of the vehicle on the basis of a first single track model for the vehicle and of a second single track model for a reference vehicle in order to approximate the side forces of the vehicle in the first single track model to the side forces of the reference vehicle in the second single track model.

7 Claims, 7 Drawing Sheets

(56) References Cited

U.S. PATENT DOCUMENTS

| | | | | |
|---|---|---|---|---|
| 8,868,288 B2* | 10/2014 | Plante | ................... | G07C 5/008 |
| | | | | 701/32.2 |
| 2017/0327123 A1* | 11/2017 | Tokimasa | ................ | B60R 21/00 |
| 2018/0354519 A1* | 12/2018 | Miyata | ................. | B60W 10/20 |
| 2018/0362038 A1* | 12/2018 | Rothmund | ............ | B60W 30/12 |
| 2019/0168746 A1* | 6/2019 | Roemer | ............. | B60L 15/2036 |
| 2019/0185053 A1* | 6/2019 | Wuthishuwong | ...... | G05B 17/02 |

FOREIGN PATENT DOCUMENTS

| | | |
|---|---|---|
| DE | 102008021530 A1 | 11/2009 |
| DE | 102010017704 A1 | 1/2012 |
| DE | 102014203026 A1 | 8/2015 |

* cited by examiner

Fig. 1

$$\ddot{\Psi} \cdot J_{ZZ} = \ell_F \cdot F_{yF}^{act} - \ell_R \cdot F_{yR}^{act} + M_z^{act} \quad (1)$$

$$\dot{\beta} = \frac{F_{yF}^{act} + F_{yR}^{act}}{mv} - \dot{\Psi} \quad (2)$$

Fig. 2

$$\ddot{\Psi}^{ref} \cdot J_{ZZ}^{ref} = \ell_F^{ref} \cdot F_{yF}^{ref} - \ell_R^{ref} \cdot F_{yR}^{ref} \quad (3)$$

$$\dot{\beta}^{ref} = \frac{F_{yF}^{ref} + F_{yR}^{ref}}{m^{ref}v} - \dot{\Psi}^{ref} \quad (4)$$

Fig. 3

$$\ddot{\Psi}^{ref} = \ddot{\Psi} \quad (5)$$

$$\dot{\beta}^{ref} = \dot{\beta} \quad (6)$$

Fig. 4

$$\frac{\ell_F \cdot F_{yF}^{act} - \ell_R \cdot F_{yR}^{act} + M_z^{act}}{J_{ZZ}} = \frac{\ell_F^{ref} \cdot F_{yF}^{ref} - \ell_R^{ref} \cdot F_{yR}^{ref}}{J_{ZZ}^{ref}} \quad (7)$$

$$\frac{F_{yF}^{act} + F_{yR}^{act}}{mv} - \dot{\Psi} = \frac{F_{yF}^{ref} + F_{yR}^{ref}}{m^{ref}v} - \dot{\Psi}^{ref} \quad (8)$$

Fig. 5

$$F_{yF}^{act} = \frac{\left(-M_z^{act} \cdot m^{ref} + m \cdot \ell_R \cdot \left(F_{yF}^{ref} + F_{yR}^{ref}\right)\right)}{m^{ref} \cdot \left(\ell_F + \ell_R\right)}$$

$$+ \frac{J_{zz} \cdot \left(F_{yF}^{ref} \cdot \ell_F^{ref} - F_{yR}^{ref} \cdot \ell_R^{ref}\right)}{J_{zz}^{ref} \cdot m^{ref} \cdot \left(\ell_F + \ell_R\right)} \quad (9)$$

$$F_{yR}^{act} = \frac{\left(M_z^{act} \cdot m^{ref} + m \cdot \ell_F \cdot \left(F_{yF}^{ref} + F_{yR}^{ref}\right)\right)}{m^{ref} \cdot \left(\ell_F + \ell_R\right)}$$

$$- \frac{J_{zz} \cdot \left(F_{yF}^{ref} \cdot \ell_F^{ref} - F_{yR}^{ref} \cdot \ell_R^{ref}\right)}{J_{zz}^{ref} \cdot m^{ref} \cdot \left(\ell_F + \ell_R\right)} \quad (10)$$

Fig. 6

$$F_{yF}^{req} = F_{yF}^{act} - F_{yF} \quad (11)$$

$$F_{yR}^{req} = F_{yR}^{act} - F_{yR} \quad (12)$$

Fig. 7

$$Q = \frac{1}{2} u_{tot}^T \cdot u_{tot} + \lambda^T \cdot \left(F_{req} - B \cdot u\right) \quad (13)$$

Fig. 8

$$u = \begin{bmatrix} \dfrac{M_z}{M_z^{max}} \\ \dfrac{2c_{WA}}{\left(c_{WA}^{max} - c_{WA}^{min}\right)} \\ \dfrac{\delta_R}{\left(\delta_R^{max}\right)} \end{bmatrix} \quad (14)$$

Fig. 9

$$u_{tot} = \begin{bmatrix} \dfrac{M_z}{M_z^{max}} \\ \dfrac{2c_{WA}}{\left(c_{WA}^{max} - c_{WA}^{min}\right)} \\ \dfrac{\delta_R}{\left(\delta_R^{max}\right)} \\ \dfrac{M_z + M_z^{cur}}{M_z^{max}} \\ \dfrac{2\left(c_{WA} + c_{WA}^{cur}\right)}{\left(c_{WA}^{max} - c_{WA}^{min}\right)} \\ \dfrac{\delta_R + \delta_R^{cur}}{\left(\delta_R^{max}\right)} \end{bmatrix} \quad (15)$$

Fig. 10

$$B = \begin{bmatrix} B_{torque} & B_{roll} & B_{RWS} \end{bmatrix} \quad (16)$$

Fig. 11

$$B_{torque} = \begin{bmatrix} \dfrac{M_z^{max}}{\ell_F + \ell_R} \\ \dfrac{M_z^{max}}{(\ell_F + \ell_R)} \end{bmatrix} \quad (17)$$

Fig. 12

$$B_{roll} = \begin{bmatrix} \dfrac{M_x \cdot \left(\dfrac{\partial F_{yFR}}{\partial F_{zFR}} - \dfrac{\partial F_{yFL}}{\partial F_{zFL}}\right)\left(c_{WA}^{max} - c_{WA}^{min}\right)}{2s_F} \\ -\dfrac{M_x \cdot \left(\dfrac{\partial F_{yRR}}{\partial F_{zRR}} - \dfrac{\partial F_{yRL}}{\partial F_{zRL}}\right)\left(c_{WA}^{max} - c_{WA}^{min}\right)}{2s_R} \end{bmatrix} \quad (18)$$

Fig. 13

$$B_{RWS} = \begin{bmatrix} 0 \\ \left(\dfrac{\partial F_{yRL}}{\partial \alpha_R} + \dfrac{\partial F_{yRR}}{\partial \alpha_R}\right) \delta_R^{max} \end{bmatrix} \quad (19)$$

Fig. 14

$$Q = \frac{(u_{cur} + u_{change})^T (u_{cur} + u_{change})}{2} + \binom{\lambda_1}{\lambda_2}^T (F_{req} - B \cdot u_{change}) \rightarrow \min(Q) \quad (20)$$

CONTROL DEVICE FOR A VEHICLE

CROSS-REFERENCE TO RELATED APPLICATION

This application claims priority to German Patent Application No. 10 2018 130 363.7, filed Nov. 29, 2018, the content of such application being incorporated by reference herein in its entirety.

FIELD OF THE INVENTION

The invention relates to a control device for a vehicle.

BACKGROUND OF THE INVENTION

DE 10 2014 203 026 A1, which is incorporated by reference herein, shows a vehicle dynamics control system in a motor vehicle having at least one electronic control unit and having an electrically regenerative drive system. Stored setpoint self-steering behavior is zo described, which is determined empirically by means of a reference vehicle without energy recovery.

SUMMARY OF THE INVENTION

A control device for a vehicle has at least one input for vehicle data of the vehicle and at least one output for manipulated values for actuators of the vehicle. The control device is designed to determine manipulated values for the actuators of the vehicle on the basis of a first single track model for the vehicle and of a second single track model for a reference vehicle in order to approximate the side forces of the vehicle in the first single track model to the side forces of the reference vehicle in the second single track model. The control device is designed to carry out the following steps for this purpose:
A) The vehicle data of the vehicle are acquired via the at least one input;
B) First side forces for the vehicle are calculated from the vehicle data, said side forces being required in order to obtain the same yaw acceleration and the same attitude angle rate in the first single track model and in the second single track model;
C) Second side forces, which must additionally be applied by the actuators, are calculated from the first side forces in the first single track model, taking into account the current side forces;
D) The second side forces are distributed mathematically between the actuators, and corresponding manipulated values are output.

A side-force-based approach for the actuators of the vehicle is thus chosen. By means of the control device, matching of the behavior of the vehicle to the behavior of a reference vehicle can be achieved within the physical limits.

According to a preferred embodiment, the manipulated values for the actuators comprise at least one of the manipulated values from the group comprising:
 manipulated value for a rear wheel steering device;
 manipulated value for a rolling moment distribution device;
 manipulated value for a driving power distribution device on a vehicle with two axle drive;
 manipulated value for a vehicle dynamics control system.

By means of these manipulated values, said actuators can be controlled, and these actuators allow comprehensive influencing of the vehicle characteristics. The rolling moment distribution device made by Porsche is also referred to as PDCC (Porsche Dynamic Chassis Control). The driving power distribution device on a vehicle with two axle drive is also referred to at Porsche as PTM (Porsche Traction Management).

According to a preferred embodiment, the control device is designed to distribute the second side forces mathematically between the actuators in step D) by forming a quality criterion, which comprises the manipulated value changes and the manipulated values arising as a result, and the change in the manipulated values is determined by minimizing the quality criterion.

By minimizing the quality criterion, it is possible to achieve very good open-loop or closed-loop control that is perceived by the driver as little as possible as open-loop or closed-loop control but instead as the natural behavior of a vehicle. A contributing factor here is that both the manipulated value changes and the manipulated values arising as a result are taken into account in the minimization. A quality criterion of this kind furthermore enables additional actuators or the shutdown of an actuator or the ignoring of said actuator to be taken into account in a simple manner.

According to a preferred embodiment, the control device is designed to form the quality criterion by optimization using the method of Lagrange multipliers, wherein, as a secondary condition, it is taken into account that the second side forces are produced by the changes in the manipulated values. Using the method of Lagrange multipliers while taking into account said secondary condition likewise allows good adaptation of the distribution between the actuators to the available actuators.

According to a preferred embodiment, the first single track model and the second single track model are designed as nonlinear single track models. The use of nonlinear single track models leads to more accurate matching of the driving behavior to the reference vehicle. Particularly when taking into account a rear wheel steering system, the result with nonlinear single track models is better than with linear single track models.

According to a preferred embodiment, the control device is designed to calculate the yaw velocity and the attitude angle from the vehicle data in the first single track model and then to use these angles in the second single track model to calculate the first side forces. Particularly in the case of nonlinear single track models, values for the yaw velocity and the attitude angle are required in the second single track model. Since the vehicle is supposed to behave like the reference vehicle, said state variables of the first model can also be used in the second model.

BRIEF DESCRIPTION OF THE DRAWINGS

Further details and advantageous developments of the invention will be found in the illustrative embodiments described below and illustrated in the drawings, which should not be interpreted in any way as restricting the invention, and in the dependent claims. It is self-evident that the features mentioned above and those which will be explained below can be used not only in the respectively indicated combination but also in other combinations or in isolation without exceeding the scope of the present invention. In the drawings:

DETAILED DESCRIPTION OF THE INVENTION

Figure 1:
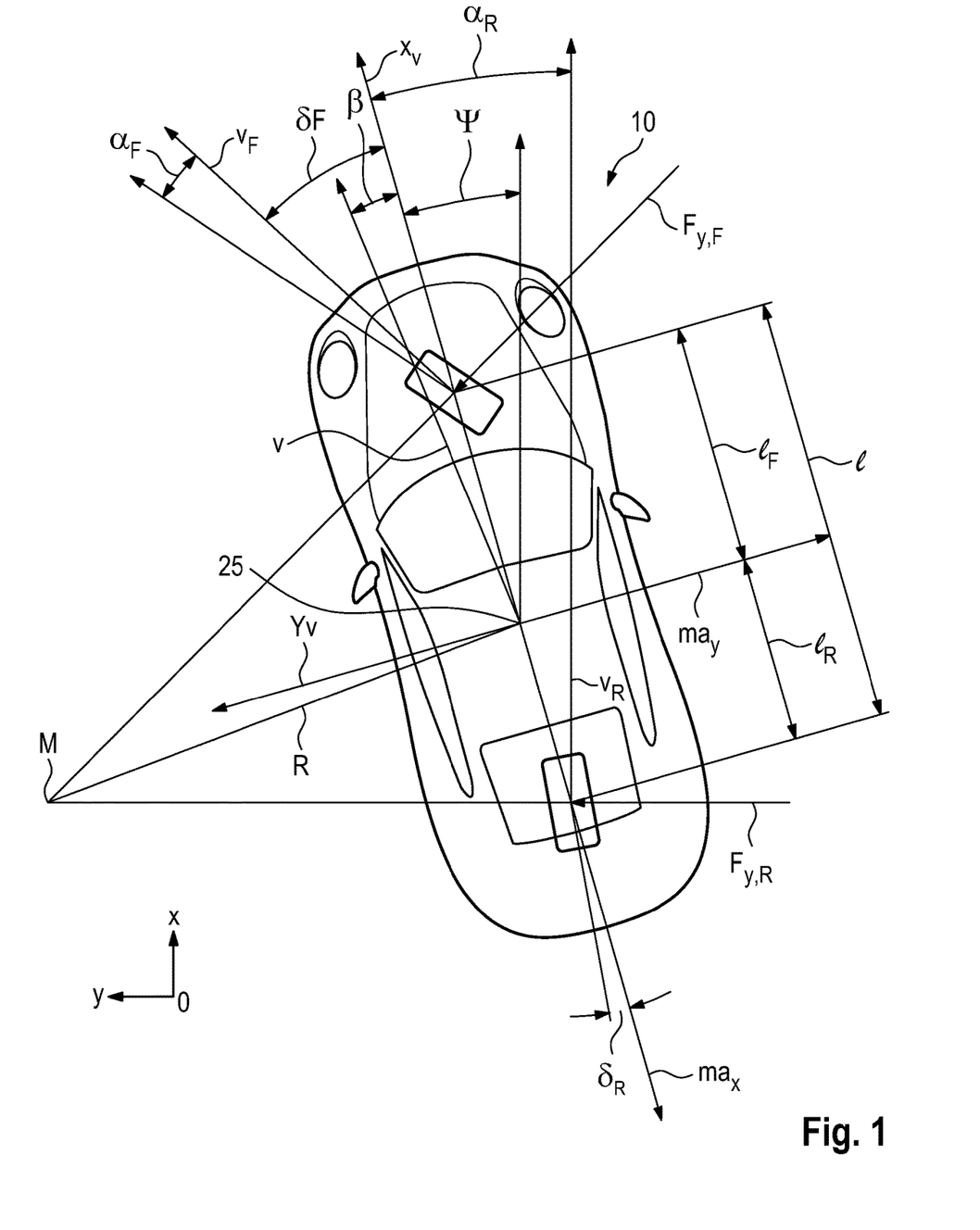
FIG. 1 shows a vehicle and an associated single track model.

FIG. 1 shows a vehicle 10. It shows the model representation of the single track model which can be used to describe and calculate side forces (transverse forces). In the single track model, the two wheels on an axle are combined notionally into a central wheel. The center of gravity of the vehicle 10 is provided with the reference sign 25, and the front wheel 21 is at a distance IF from the center of gravity 25. In the same way, the rear wheel 22 is at a distance IR from the center of gravity 25. The total length between the front axle (front wheel) 21 and the rear axle (rear wheel) 22 is denoted as I.

In the illustrative embodiment, the vehicle 10 has both a front wheel steering system and a rear wheel steering system. The front wheel steering angle is denoted by 5F and the rear wheel steering angle is denoted by $\delta_R$. The yaw angle $\psi$ indicates the rotation of the vehicle about the vertical axis, which is fixed in relation to the vehicle. In corresponding fashion, the yaw velocity $\psi'$ provides a measure of the change in the yaw angle $\psi$ with time, and the yaw acceleration $\psi''$ indicates the time derivative of the yaw velocity $\psi'$. Also shown is the attitude angle $\beta$ between the direction of motion of the vehicle center of gravity 25 and the vehicle longitudinal axis 28.

The velocity at which the front wheel 21 is moving is denoted by $v_F$, and the velocity of the rear wheel 22 is denoted by $v_R$. The angle between the direction of running of the front wheel 21 and the actual velocity $v_F$ is referred to as the front slip angle $\alpha_F$. In the same way, the rear slip angle $\alpha_R$ denotes the angle between the direction of running of the rear wheel 22 and the direction of the velocity of the rear wheel 22.

The centripetal force acting on the center of gravity 25 in the single track model is shown as $m \cdot a_y$. The side force acting on the front wheel 21 is denoted by $F_{y,F}$, and the side force acting on the rear wheel 22 is denoted by $F_{y,R}$.

The aim of the control device of the vehicle is to influence the vehicle 10 with the aid of actuators, in particular with the aid of an active suspension, in such a way that it behaves like a desired reference vehicle.

Figure 2:
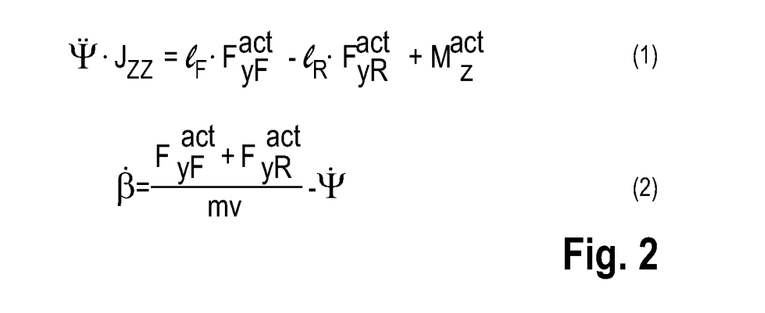
FIG. 2 shows a motion formula for the vehicle in FIG. 1 in the single track model.

FIG. 2 shows two equations (1) and (2), which illustrate the motion equations in the single track model. The motion equations are obtained from the principle of linear momentum and the principle of angular momentum. Here:

$\psi''$ is the yaw acceleration
$J_{zz}$ is the moment of inertia for the rotation about the Z axis
$F_{yF,act}$ is the transverse force acting at the front
$F_{yR,act}$ is the side force acting at the rear
$M_{z,act}$ is the resultant yaw moment
m is the mass of the vehicle
v is the velocity of the vehicle at the center of gravity 25.

The term $M_{z,act}$ takes account of the yaw moment which can be produced by a torque vectoring system. By means of a torque vectoring system, it is possible to produce asymmetric longitudinal forces.

Figure 3:
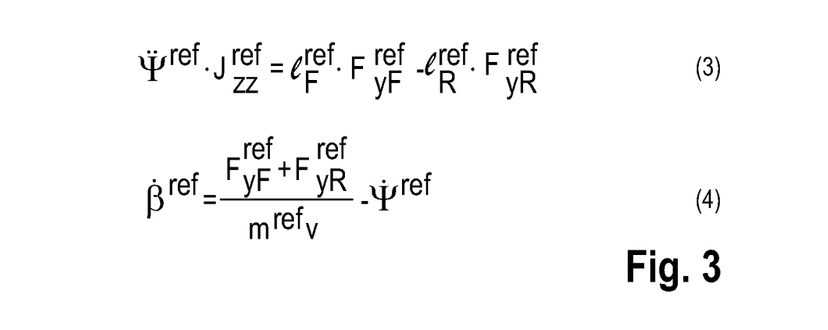
FIG. 3 shows a motion formula for a reference vehicle in the single track model.

FIG. 3 shows the corresponding motion equations (3), (4) for a reference vehicle, and the corresponding parameters of the reference vehicle are denoted by "ref". In the illustrative embodiment, the reference vehicle does not have a torque vectoring system, and the corresponding term $M_{z,act}$ of equation (1) is therefore not contained in equation (3). As can be seen, the moment of inertia $J_{zz,ref}$ and the mass $m_{ref}$ of the reference vehicle can differ from the corresponding parameters of the actual vehicle 10.

Figure 4:
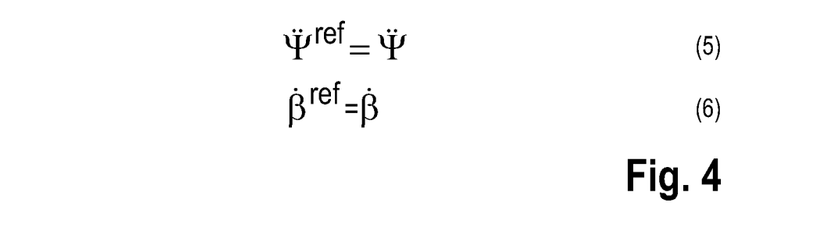
FIG. 4 shows two formulas for equalizing the yaw acceleration and the attitude angle rate of the single track models of the vehicle and of the reference vehicle.

FIG. 4 shows, in equation (5), an equalization of the yaw acceleration of the reference vehicle and of the actual vehicle 10, and, in equation (6) an equalization of the attitude angle rate of the reference vehicle with the attitude angle rate of the actual vehicle 10. This assumption expresses the fact that the behavior or response of the reference vehicle coincides with that of the actual vehicle 10.

Figure 5:
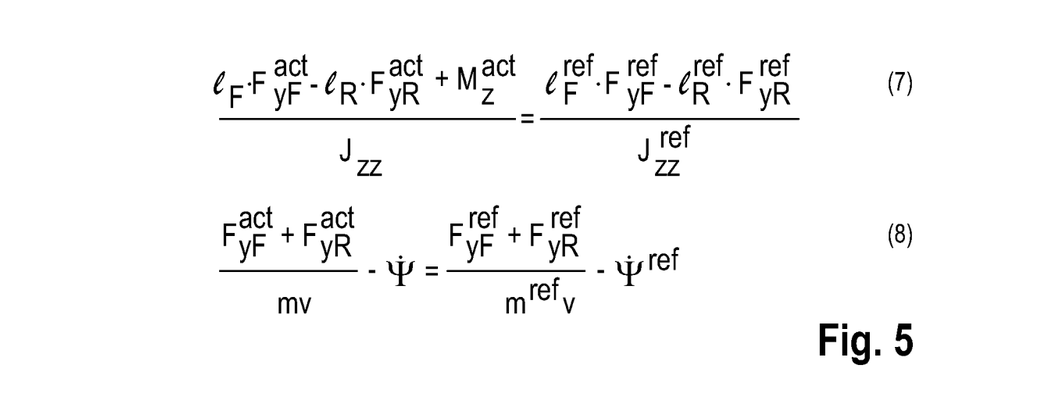
FIG. 5 shows the results of substituting the formulas in FIG. 2 and FIG. 3 in the formulas in FIG. 4.

FIG. 5 shows, in equation (7), the result of substituting equations (1) and (3) in equation (5), and equation (8) shows the results of substituting equations (2) and (4) in equation (6).

Figure 6:
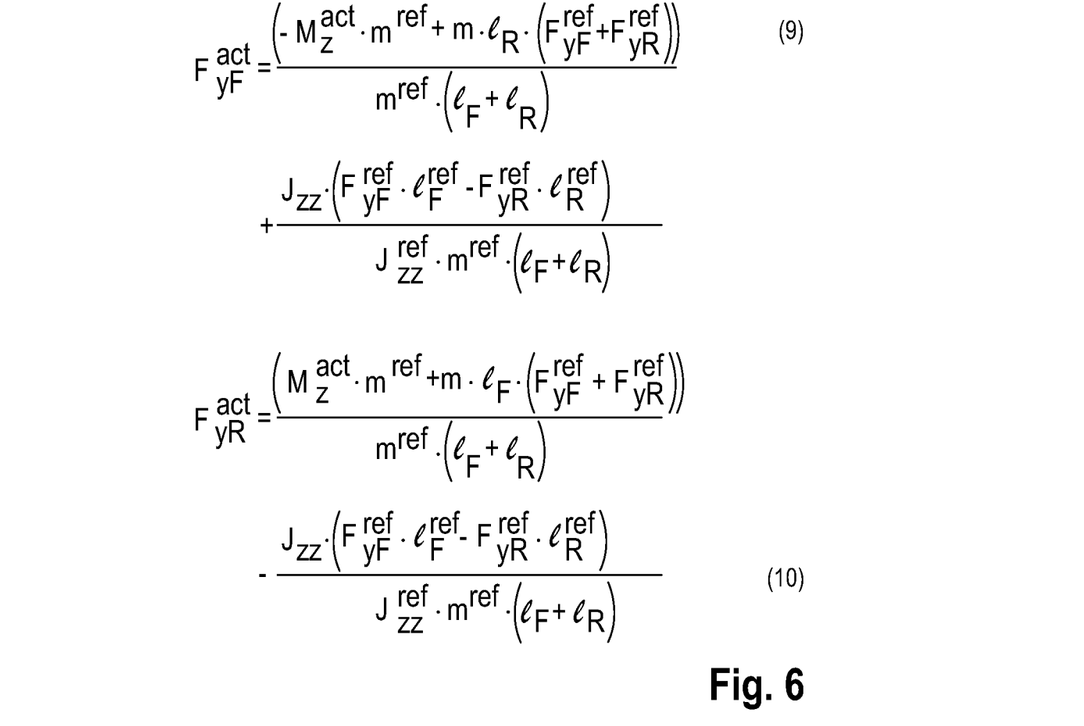
FIG. 6 shows formulas for the side forces at the front and rear axles, which are obtained from the formulas in FIG. 5.

FIG. 6 shows, in equation (9), the side force of the front wheel 21 obtained from equations (7) and (8) in the single track model. Equation (10) shows the side force $F_{yR,act}$ acting on the rear wheel 22 in the single track model, said force being obtained from equations (7) and (8). Here, the yaw velocities $\psi'$ and $\psi'_{ref}$ can be equalized since both vehicle models are initially in the same or current state. If the yaw velocity $\psi'$ and the attitude angle $\beta$ are required for calculating the single track model for the reference model, e.g. for a nonlinear wheel model, the corresponding values of vehicle 10 can be used.

The side forces defined in equations (9) and (10) can be calculated in the control device. Physically, these side forces are the side forces in the single track model which are required to ensure that the vehicle 10 behaves like the reference vehicle in accordance with equations (5), (6).

Figure 7:
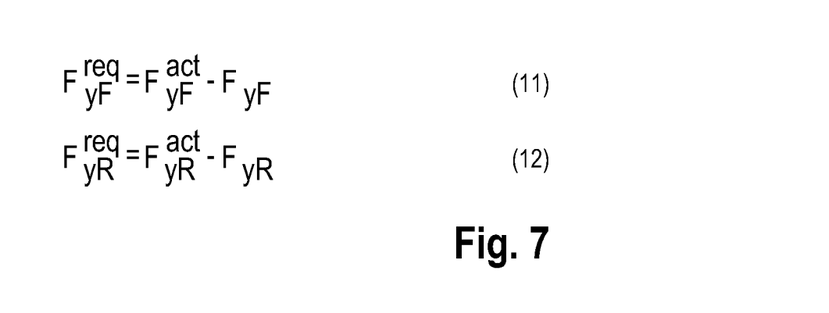
FIG. 7 shows formulas for the forces additionally required at the front and rear axles in order to obtain matching of the behavior of the vehicle and of the reference vehicle.

FIG. 7 shows, in equation (11), a calculation of the force $F_{yF,req}$ additionally to be produced at the front wheel 21 by the actuators, and equation (12) shows the corresponding force $F_{yR,req}$ which must additionally be produced at the rear wheel by the actuators. For this purpose, the forces which have been calculated in equations (9) and (10) are reduced by the respective side forces $F_yF$ and $F_yR$ which already occur in the single track model of the vehicle 10 since these side forces are already physically present and are obtained mathematically from the first single track model.

Equations (11) and (12) indicate the required side forces which must be produced by the actuators. If there are only a few actuators, distribution with fixed proportions is possible, for example. However, modern vehicles 10 have a large number of actuators, and the corresponding side forces can be produced in various ways. In order to achieve handling which is as natural as possible, it is advantageous to minimize the influence exerted by the individual actuators and the change in the influence exerted. This is an optimization problem.

Figure 8:
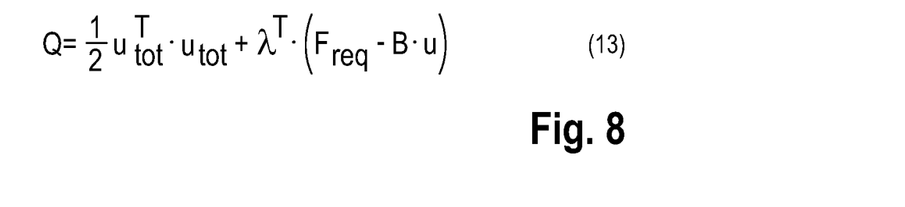
FIG. 8 shows a quality criterion for the manipulated values and manipulated value changes.

FIG. 8 shows, in equation (13), a quality criterion Q.

The vector $u_{tot}$ contains both normalized manipulated value changes $u_{change}$ and the changed normalized manipulated values $u_{cur}+u_{change}$, wherein $u_{cur}$ is the current actuator position before the change. The size of the vector $u_{tot}$ is dependent on the number of actuators to be taken into account. The scalar product of the transposed vector $u_{tot}^T$ with the vector $u_{tot}$ is formed.

In the right-hand part, Lagrange multipliers are used as a secondary condition to indicate that the side forces $F_{req}$ to be produced by the actuators are produced with the manipulated value changes. The matrix B is referred to as an effectiveness matrix, and it describes the effect of the individual manipulated value changes on the side forces.

Figure 9:
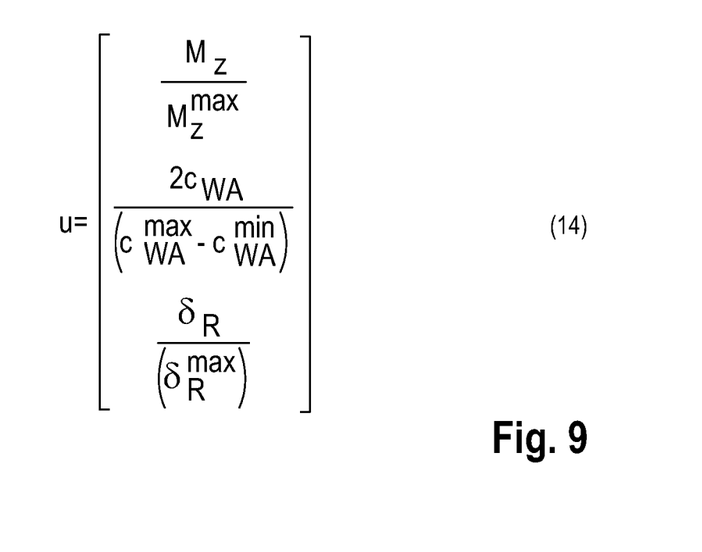
FIG. 9 shows a vector with manipulated value changes.

FIG. 9 shows the normalized vector u in equation (14), taking into account, by way of example, the following actuators: torque distribution, longitudinal moment distribution and rear wheel steering system. The respective manipulated value changes are taken into account.

Figure 10:
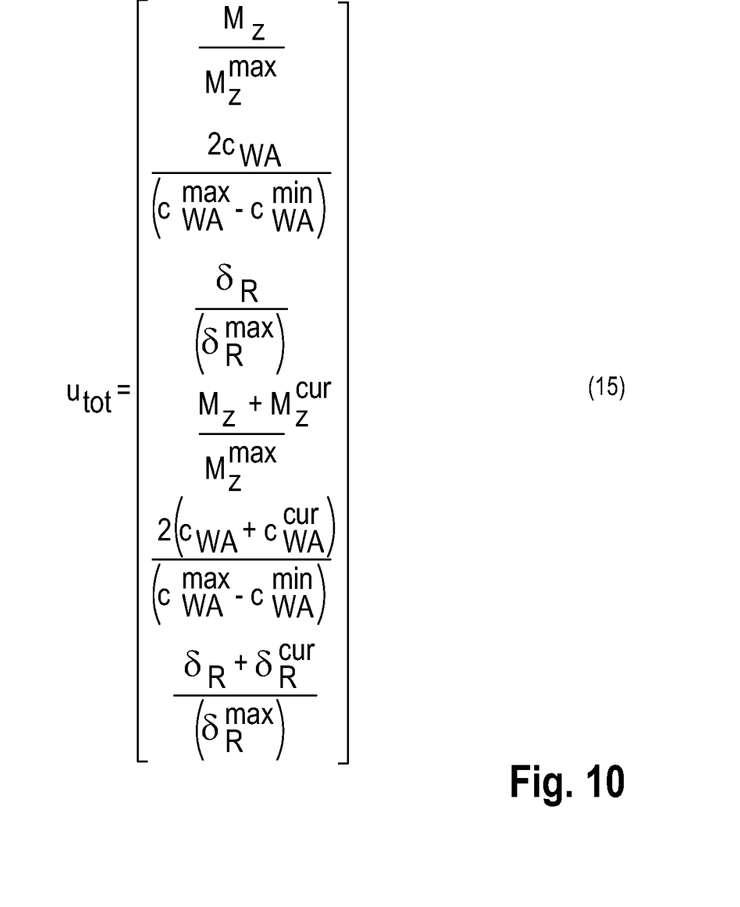
FIG. 10 shows a vector with manipulated value changes and new manipulated values.

FIG. 10 shows, in equation (15), the vector $u_{tot}$, which contains both the normalized manipulated value changes and the total magnitude of the changed manipulated values in normalized form, which is obtained from the previous manipulated value with the addition "cur" and the manipulated value change.

Figure 11:
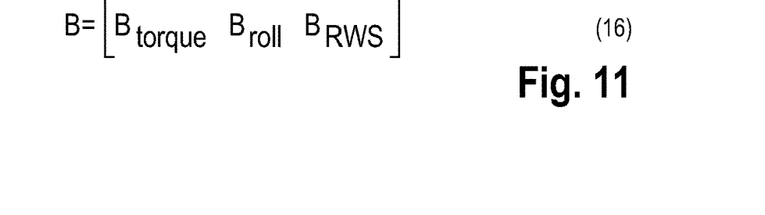
FIG. 11 shows an example of the basic structure of an effectiveness matrix.

FIG. 11 shows, in equation (16), the fundamental structure of the effectiveness matrix B. In the specific illustrative embodiment, this is made up of the effectiveness matrices $B_{torque}$, $B_{roll}$ and $B_{RWS}$. In the illustrative embodiment, the torque distribution (torque), the rolling moment distribution (roll) and the rear wheel steering (RWS) are thus taken into account.

Figure 12:
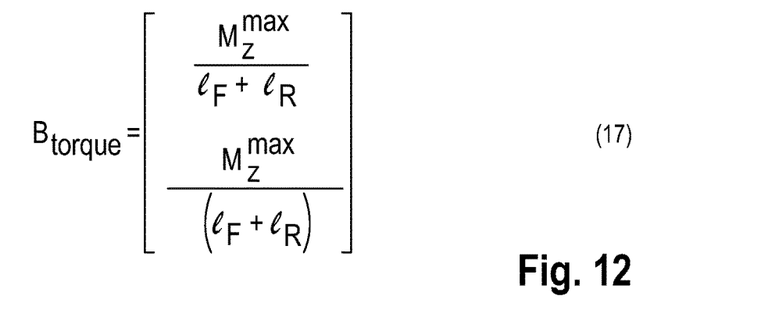
FIG. 12 shows an example of an effectiveness matrix for a torque distribution.

FIG. 12 shows by way of example, in equation (17), the effectiveness matrix $B_{torque}$ for a torque distribution. In this case, $M_{z,max}$ is the maximum yaw moment, using which the normalization is performed.

Figure 13:
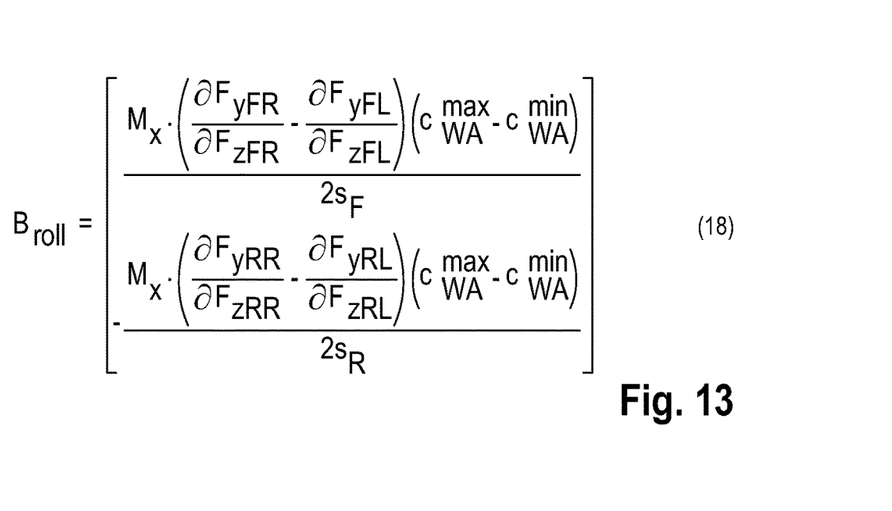
FIG. 13 shows an example of an effectiveness matrix for a rolling moment distribution.

FIG. 13 shows, in equation (18), the effectiveness matrix $B_{roll}$, which describes the effect of the rolling moment distribution. $M_x$ is the moment in the longitudinal direction (conventional coordinate system fixed in relation to the vehicle), and the terms $\partial F_y/\partial F_z$ calculate the gradient of the side forces as a function of the respective wheel load. The additional indices signify:
FR: front right
FL: front left
RR: rear right
RL: rear left In the rolling moment distribution, the term $c_{WA}$ denotes the proportion at the front axle, and the difference between the maximum proportion and the minimum proportion is formed in each case. The term $S_F$ denotes the distance between the front wheels of the vehicle, and the term $S_R$ denotes the distance between the rear wheels of the vehicle. Even in the single track model, the rolling moment is thus taken into account using the actual distance between the front wheels or rear wheels.

Figure 14:
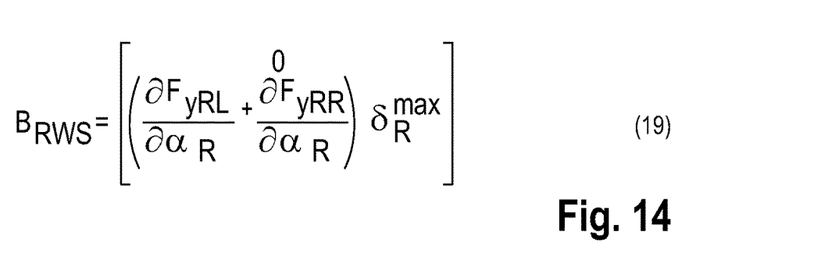
FIG. 14 shows an example of an effectiveness matrix for a rear wheel steering system.

FIG. 14 shows, in equation (19), the effectiveness matrix $B_{RWS}$ for the rear wheel steering system. This has an effect only on the rear side forces. $\delta_{R,max}$ is the maximum deflection angle of the rear wheel steering system, and $\alpha_R$ is the rear slip angle.

For further or other actuators, the equations must be adapted correspondingly. This is possible in modular fashion.

Some of the manipulated values calculated in the single track model can be used directly in the vehicle 10, e.g. by using the rear wheel steering angle $\delta_R$ for both rear wheels. Other manipulated values, such as the manipulated value for the rolling moment distribution, are converted in a further step into manipulated values for the stabilizers or for the active suspension.

Figure 15:
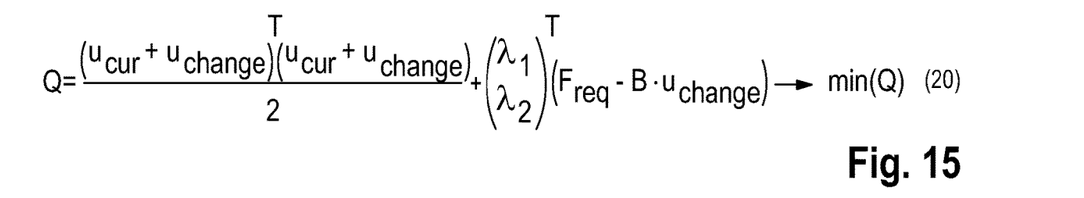
FIG. 15 shows another embodiment of a quality criterion for the manipulated values and manipulated value changes.

FIG. 15 shows, in equation (20), another illustrative embodiment of a quality criterion Q.

The vector $u_{cur}$ contains the current manipulated values for the position of the actuators, and the vector $u_{change}$ contains the change of the manipulated values or the position of the actuators. Thus, a scalar product is formed from the transposed total vector comprising $u_{cur}$ and $u_{change}$ and the total vector comprising $u_{cur}$ and $u_{change}$. The right-hand part of the equation (20) corresponds to the secondary condition, as also contained in FIG. 8.

The right-hand side of the equation (20) indicates that a minimization takes place after the formation of the quality criterion Q in order thereby to determine suitable manipulated value changes $u_{change}$.

One special feature of the method is that the control device 30 preferably does not determine the manipulated values by closed-loop control but determines them from the current state of the vehicle with the single track models. This is also referred to as a feedforward approach.

Figure 16:
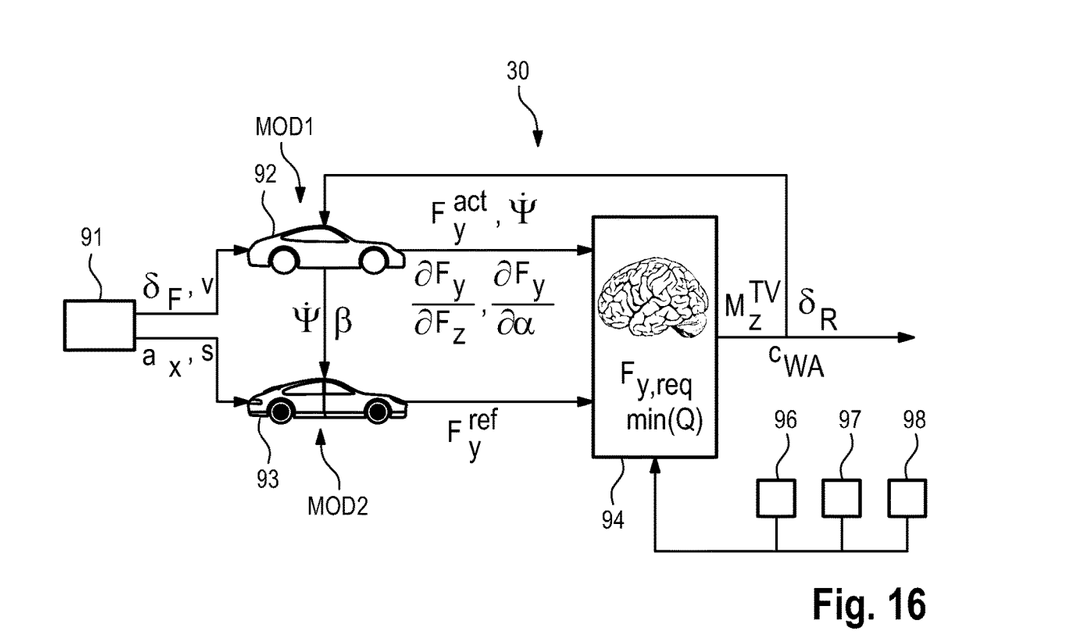
FIG. 16 shows the basic control process of a control device in a schematic illustration.

FIG. 16 shows an overall view of the process running in the control device.

The driver 91 or a device for autonomous driving as well as the vehicle 10 itself specify vehicle data for the vehicle 10, in particular one or more of the group comprising:
front wheel steering angle $\delta_F$ of or steering wheel position velocity v
longitudinal acceleration $a_x$
transverse acceleration $a_y$
longitudinal slip s These vehicle data are fed in both to the first single track model 92 for the vehicle 10 and to the second single track model 93 for the reference vehicle 11.

The yaw velocity $\psi'$ and the attitude angle $\beta$ are preferably calculated in the first single track model 92 and likewise fed to the second single track model 93.

From the first single track model 92, the transverse forces $F_{y,act}$ of the vehicle 10, the yaw velocity $\psi'$ and the gradients $\partial F_y/\partial F_z$ (gradient of the side forces as a function of the respective wheel load) and $\partial F_y/\partial \alpha$ (slip rigidity) are fed into a processing unit 94. The transverse forces $F_y$,ref of the reference vehicle are fed in from the second single track model 93.

The processing unit 94 is preferably additionally supplied with manipulated variable limits of devices 96, 97, 98, which are, for example, manipulated variable limits for the actuators, e.g. a maximum steering angle of the rear wheel steering system.

In the processing unit 94, manipulated values are calculated from these data and output to the actuators. In the illustrative embodiment, these are the rear wheel steering angle $\delta_R$, the manipulated value $c_{wa}$ for the rolling moment distribution, the manipulated value $M_{z,TV}$ for the yaw moment due to the torque distribution (TV=torque vectoring).

The manipulated values are furthermore transferred to the first and second single track models 92, 93.

Modern vehicles 10 always contain relatively powerful actuators and, with these, new degrees of freedom. Thus, for example, a very powerful torque vectoring method can be used with wheel hub motors of electrically operated vehicles. The behavior of the vehicle 10 can thus be greatly influenced in the direction of the characteristics of a different motor. Increasing configuration possibilities for customer vehicles are thereby obtained.

Since the different actuators can all be taken into account in the control device 30, the control device 30 can be designed as a central control device 30.

By means of the calculations shown, additional actuators and additional vehicle data can be taken into account in a modular fashion, and the intervention of the control device can be adapted.

The parameters of the reference model can be determined by means of application runs with a reference vehicle, for example. On the basis of the measurements of the handling of the vehicle, characteristic maps can be produced, which define the handling. In tests, corresponding parameters were determined for a reference vehicle of the Porsche Carrera 911 4 GTS type (Type 991 II). The behavior of a vehicle of the Porsche 911 Turbo S type (Type 991 II) with all wheel drive, rear wheel steering and an electronic differential was then adapted to the behavior of the reference vehicle. The actuators allow free torque distribution within the predetermined limits and thus good adaptation of the handling to the handling of the reference vehicle.

By virtue of the minimization of the quality criterion Q, the control device becomes less perceptible as such. An ideal control device or an ideal controller is imperceptible to the driver, and the vehicle drives like a perfect passive reference vehicle, for example.

Figure 17:
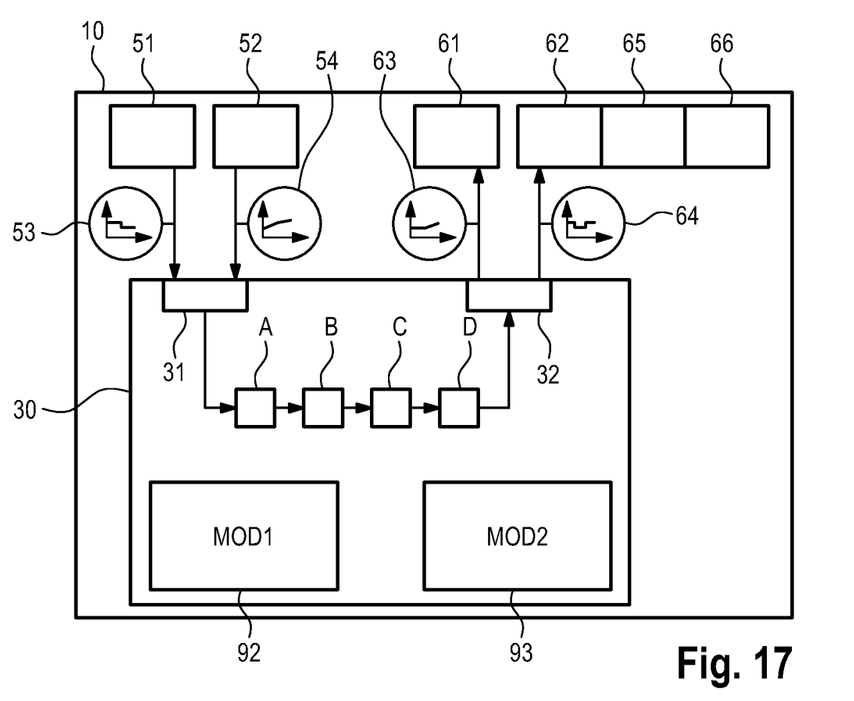
FIG. 17 shows the vehicle with the control device in a schematic illustration.

FIG. 17 shows the vehicle 10 with the control device 30. The control device 30 has an input 31 and an output 32. Via the input 31, vehicle data 53 and 54 are fed into the control device. The vehicle data 53 come from a device 51, for example, which is a steering wheel position sensor. The vehicle data 54 come from a device 52 which measures the current velocity of the vehicle or the transverse acceleration, for example.

The vehicle data pass via the input 31 to a series of steps A, B, C, D and, from step D, manipulated values are output via the output, e.g. to the actuators 61, 62, 65 and 66. These are, for example rear wheel steering device 61;

rolling moment distribution device 62;

driving power distribution device 65;

vehicle dynamics control system 66.

In step A, the vehicle data 53, 54 of the vehicle 10 are acquired via the at least one input 31.

In step B, first side forces $F_{yF,act}$, $F_{yR,act}$ for the vehicle 10 are calculated from the vehicle data 53, 54, said side forces being required in order to obtain the same yaw acceleration $\psi''$ and the same attitude angle rate $\beta'$ in the first single track model 92 and in the second single track model 93. The first single track model 92 can also be referred to as MOD1, and the second single track model 93 can also be referred to as MOD2.

In step C, second side forces $F_{yF,req}$, $F_{yR,req}$, which must additionally be applied by the actuators 61, 62, 65, 66, are calculated from the first side forces $F_{yF,act}$, $F_{yR,act}$ in the first single track model 92, taking into account the current side forces.

In step D, the second side forces $F_{yF,req}$, $F_{yR,req}$ are distributed mathematically between the actuators 61, 62, 65, 66, and corresponding manipulated values 63, 64 are output via the at least one output 32.

As a result, the systems of the vehicle 10 are controlled by the method shown in such a way that the handling thereof corresponds within the scope of the possibility of the systems to the handling of the reference vehicle.

A suitable tire model must also be chosen for the single track model since the interaction between the tires and the road significantly influences the movement of the vehicle. The tire model for the single track controller preferably takes into account at least the following parameters:

longitudinal slip, attitude angle, wheel load.

This allows good prediction, especially also in the case of sporty driving. In tests, a semi-empirical tire model is chosen, which is based on the similarity method of Hans Pacejka, which defines the "magic formula".

Further dependencies on the yaw velocity $\psi'$ and the attitude angle $\beta$ can be added in the single track model, e.g. using the front slip angle $\alpha_F$ and the rear slip angle $\alpha_R$, which can have corresponding dependencies. By virtue of such dependencies, the single track model becomes a non-linear single track model.

By the very nature of the case, multiple adaptations and modifications are possible within the scope of the present invention.

The calculation of the first side forces, of the second side forces and of the current side forces in the single track model have been shown as different calculations. By their very nature, these calculations can be performed together in the implementation, e.g. by substituting the formulas of equations (9) and (10) in equations (11) and (12). As a result, the physical basis remains the same.

What is claimed is:

1. A control device for a vehicle, said control device comprising:

at least one input for vehicle data of the vehicle, at least one output for manipulated values for actuators of the vehicle, the control device being configured to determine the manipulated values for the actuators of the vehicle on the basis of a first single track model for the vehicle and of a second single track model for a reference vehicle in order to approximate side forces of the vehicle in the first single track model to side forces of the reference vehicle in the second single track model, the control device being configured to carry out the following steps for this purpose:

A) acquiring the vehicle data of the vehicle via the at least one input;

B) calculating first side forces ($F_{yF,act}$, $F_{yR,act}$) for the vehicle from the vehicle data, said first side forces being required in order to obtain the same yaw acceleration ($\psi''$) and the same attitude angle rate ($\beta'$) in the first single track model and in the second single track model;

C) calculating second side forces ($F_{yF,req}$, $F_{yR,req}$), which are additionally applied by the actuators, from the first side forces ($F_{yF,act}$, $F_{yR,act}$) in the first single track model, taking into account the current side forces; and D) mathematically distributing the second side forces ($F_{yF,req}$, $F_{yR,req}$) between the actuators, and outputting the corresponding manipulated values via the at least one output.

2. The control device as claimed in claim 1, in which the manipulated values for the actuators comprise at least one of the manipulated values from a group comprising:
- a manipulated value for a rear wheel steering device;
- a manipulated value for a rolling moment distribution device;
- a manipulated value for a driving power distribution device on a vehicle with two axle drive; and
- a manipulated value for a vehicle dynamics control system.

3. The control device as claimed in claim 1, the control device being configured to distribute the second side forces ($F_{yF,req}$, $F_{yR,req}$) mathematically between the actuators in step D) by forming a quality criterion (Q), which comprises manipulated value changes (u) and the manipulated values arising as a result, and a change in the manipulated values is determined by minimizing the quality criterion (Q).

4. The control device as claimed in claim 3, the control device being configured to form the quality criterion (Q) by optimization using a method of Lagrange multipliers, wherein, as a secondary condition, the control device takes into account that the second side forces ($F_{yF,req}$, $F_{yR,req}$) are produced by the changes in the manipulated values.

5. The control device as claimed in claim 1, in which the first single track model and the second single track model are configured as nonlinear single track models.

6. The control device as claimed in claim 1, the control device being configured to calculate a yaw velocity ($\psi'$) and an attitude angle ($\beta$) from the vehicle data in the first single track model and then use the attitude angle ($\beta$) in the second single track model to calculate the first side forces ($F_{yF,act}$, $F_{yR,act}$).

7. A method for operating a control device for a vehicle, said control device comprising at least one input for vehicle data of the vehicle, at least one output for manipulated values for actuators of the vehicle, the control device being configured to determine the manipulated values for the actuators of the vehicle on the basis of a first single track model for the vehicle and of a second single track model for a reference vehicle in order to approximate side forces of the vehicle in the first single track model to side forces of the reference vehicle in the second single track model, said method comprising:

A) acquiring the vehicle data of the vehicle via the at least one input;

B) calculating first side forces ($F_{yF,act}$, $F_{yR,act}$) for the vehicle from the vehicle data, said first side forces being required in order to obtain the same yaw acceleration ($\psi''$) and the same attitude angle rate ($\beta'$) in the first single track model and in the second single track model;

C) calculating second side forces ($F_{yF,req}$, $F_{yR,req}$), which are additionally applied by the actuators, from the first side forces ($F_{yF,act}$, $F_{yR,act}$) in the first single track model, taking into account the current side forces; and D) mathematically distributing the second side forces ($F_{yF,req}$, $F_{yR,req}$) between the actuators, and outputting the corresponding manipulated values via the at least one output.

* * * * *